US011760465B2

(12) United States Patent
Newsam

(10) Patent No.: US 11,760,465 B2
(45) Date of Patent: Sep. 19, 2023

(54) AIRCRAFT WING CONTROL

(71) Applicant: Stellar Advanced Concepts Ltd, London (GB)

(72) Inventor: Michael Newsam, Tower Hamlets (GB)

(73) Assignee: Stellar Advanced Concepts Ltd, London (GB)

( * ) Notice: Subject to any disclaimer, the term of this patent is extended or adjusted under 35 U.S.C. 154(b) by 128 days.

(21) Appl. No.: 17/595,649

(22) PCT Filed: May 28, 2020

(86) PCT No.: PCT/GB2020/051298
§ 371 (c)(1),
(2) Date: Nov. 22, 2021

(87) PCT Pub. No.: WO2020/240191
PCT Pub. Date: Dec. 3, 2020

(65) Prior Publication Data
US 2022/0219802 A1    Jul. 14, 2022

(30) Foreign Application Priority Data

May 28, 2019 (GB) ...................................... 1907526
Jul. 19, 2019 (GB) ...................................... 1910379

(51) Int. Cl.
*B64C 3/54*   (2006.01)
*B64C 3/42*   (2006.01)
(Continued)

(52) U.S. Cl.
CPC ................ *B64C 3/546* (2013.01); *B64C 3/42* (2013.01); *B64C 39/024* (2013.01); *B63G 8/18* (2013.01);
(Continued)

(58) Field of Classification Search
CPC .......... B64C 3/546; B64C 3/42; B64C 39/024; B64C 2003/543; B64C 3/56; B63G 8/18; B64U 30/12; B64U 2101/15
See application file for complete search history.

(56) References Cited

U.S. PATENT DOCUMENTS 2,972,898 A * 2/1961 Hartel ...................... G05G 5/06
                                                        92/24
3,203,650 A * 8/1965 Christenson ............. B64G 1/62
                                                        244/46
(Continued)

FOREIGN PATENT DOCUMENTS

CN    107 284 651 A    10/2017
CN    108 248 826 A     7/2018
(Continued)

OTHER PUBLICATIONS

PCT/GB2020/051298 International Search Report and Written Opinion dated Sep. 7, 2020.
United Kingdom Search Report in GB1910379.5 dated Oct. 28, 2021.

*Primary Examiner* — Justin M Benedik
(74) *Attorney, Agent, or Firm* — Woodard Emhardt Henry Reeves & Wagner LLP

(57) ABSTRACT

A vehicle comprising a morphing wing and a body is disclosed. The aircraft is configured to transform from a first configuration into a second configuration for ascent or descent of the aircraft. The drag force and lift force on the aircraft in the second configuration are less than in the first configuration. Transforming from the first to the second configuration comprises: contracting the wing within a geometric plane defined by the wing, and rotating the outer edge of the wing downwards, out of the geometric plane.

20 Claims, 7 Drawing Sheets

(51) Int. Cl.
*B64C 39/02* (2023.01)
*B63G 8/18* (2006.01)
*B64U 30/12* (2023.01)
*B64U 101/15* (2023.01)

(52) U.S. Cl.
CPC ........ *B64C 2003/543* (2013.01); *B64U 30/12* (2023.01); *B64U 2101/15* (2023.01)

(56) References Cited

U.S. PATENT DOCUMENTS

| | | | | |
|---|---|---|---|---|
| 5,072,894 A | * | 12/1991 | Cichy | B64C 23/072 |
| | | | | D12/337 |
| 5,127,605 A | * | 7/1992 | Atchison | B64C 5/18 |
| | | | | 244/82 |
| 7,762,500 B1 | * | 7/2010 | Dhall | B64C 39/12 |
| | | | | 244/45 R |
| 7,931,240 B2 | * | 4/2011 | Kothera | B63B 1/248 |
| | | | | 244/99.2 |
| 8,439,314 B1 | * | 5/2013 | Dhall | B64C 39/12 |
| | | | | 244/45 R |
| 8,864,065 B2 | * | 10/2014 | Koehler | B64C 3/56 |
| | | | | 244/49 |
| 2004/0065246 A1 | * | 4/2004 | Allen | B60V 1/08 |
| | | | | 114/274 |
| 2006/0118675 A1 | * | 6/2006 | Tidwell | B64C 3/40 |
| | | | | 244/123.1 |
| 2006/0144992 A1 | * | 7/2006 | Jha | B64C 3/40 |
| | | | | 244/46 |
| 2010/0282917 A1 | * | 11/2010 | O'Shea | B64C 39/068 |
| | | | | 244/49 |
| 2013/0200208 A1 | * | 8/2013 | Koehler | F42B 10/14 |
| | | | | 244/218 |

FOREIGN PATENT DOCUMENTS

| | | |
|---|---|---|
| GB | 191000236 | 8/1910 |
| GB | 2205798 | 12/1988 |
| GB | 2368829 | 8/2003 |
| GB | 2490141 | 2/2015 |
| GB | 2505942 | 6/2015 |
| JP | S61 34695 U | 3/1986 |

* cited by examiner

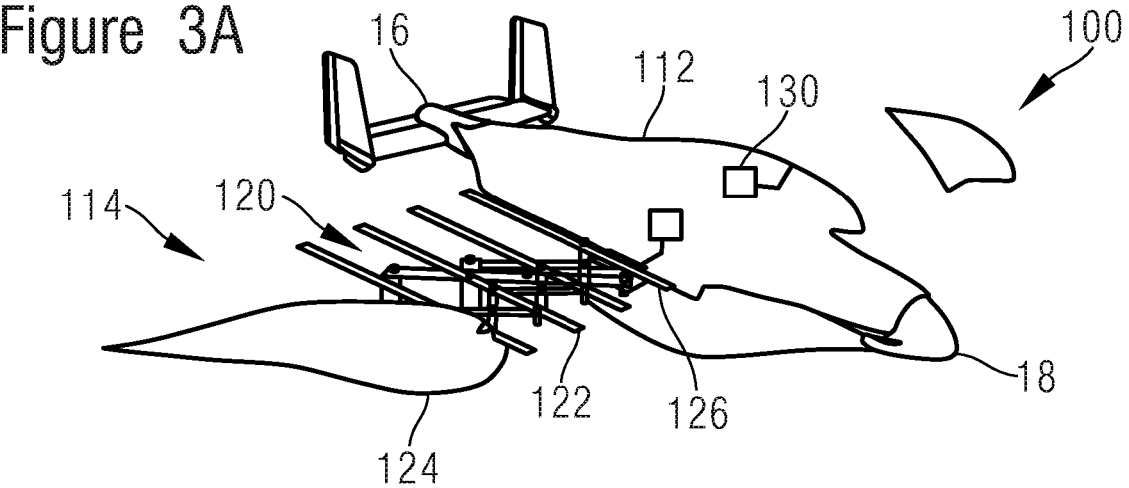
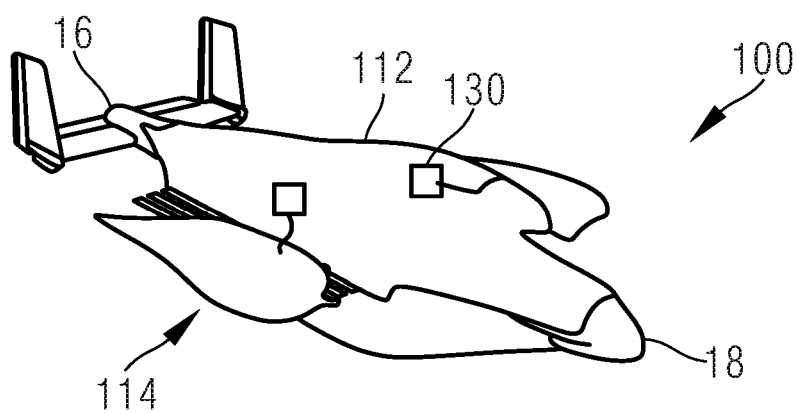
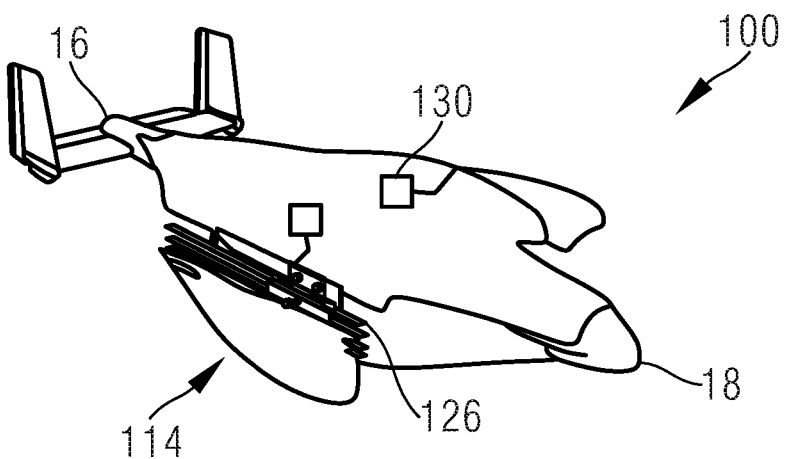

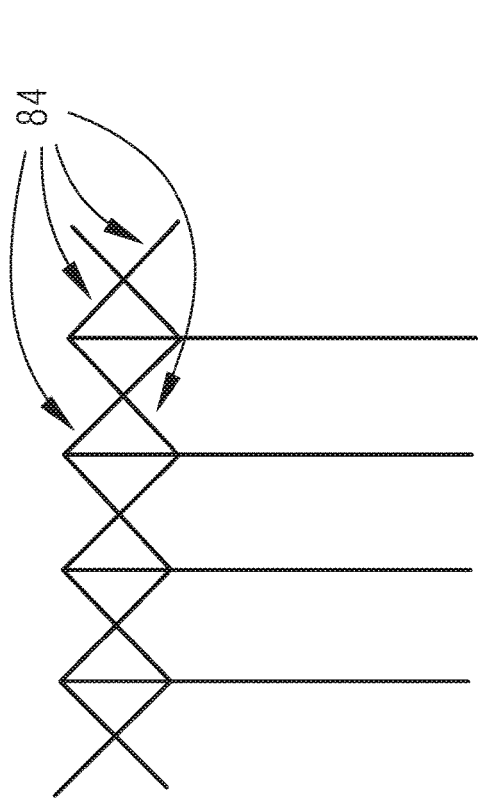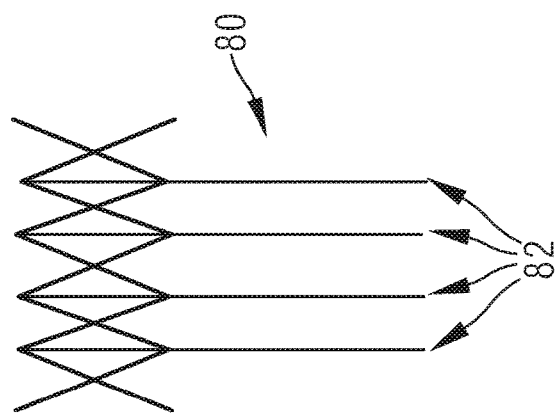
Figure 8A
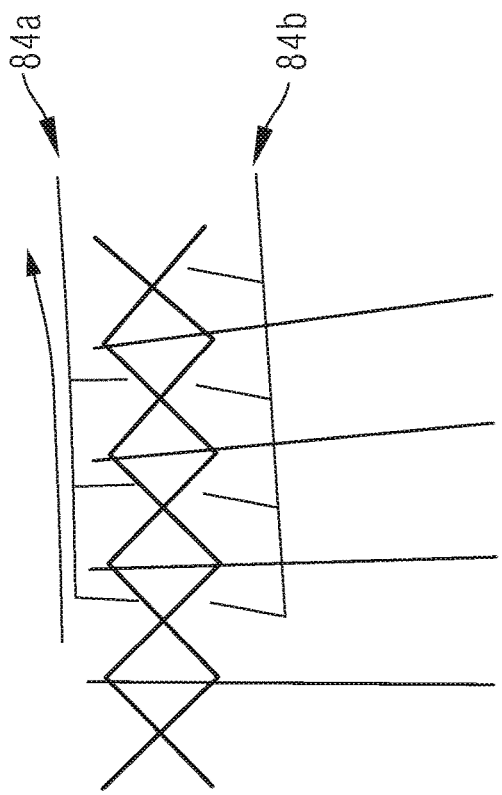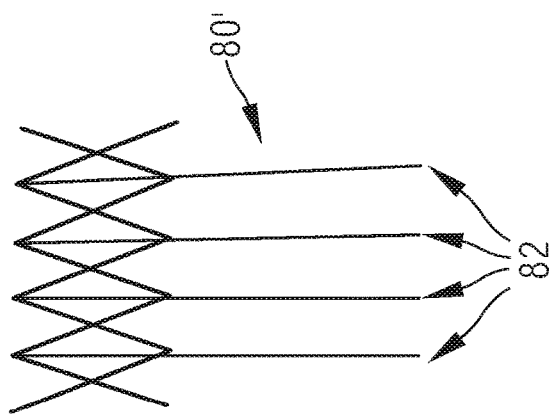
Figure 8B

AIRCRAFT WING CONTROL

FIELD

The present disclosure relates to the design of vehicles, such as unmanned aerial vehicles, and in particular to the structure and control of wings for such vehicles.

BACKGROUND

Many types of vehicles use aerodynamic elements to improve their performance, for example to generate downforce or other desirable forces on the vehicle. For example high performance cars can comprise spoilers which may be moveable. High speed boats such as catamarans and trimarans may employ multiple hulls for greater hydrodynamic performance in comparison to mono-hull vessels.

Additionally, aircraft such as unmanned aerial vehicles (UAVs) are used in a range of different environments, such as for reconnaissance purposes or for the delivery of a payload. Moreover, these vehicles may be operated by a variety of different users. For example, private individuals may use them for their own recreational use, they may be deployed by military organisations to achieve a strategic goal, and increasingly commercial business are looking to utilise the capabilities that they provide.

The potential dangers posed by the use of UAVs, militarily or otherwise, has also lead to the development of Counter-UAV technology and systems. These systems predominantly rely on ground-based apparatus for the detection and disruption or destruction of UAVs that are deemed to pose a threat.

Conventional varieties of such vehicles typically use wings with fixed aerofoils, or alternatively moving rotors, to provide lift to the vehicle; and the positioning and/or movement of these and other conventional aerodynamic components may be controlled in order to control and manoeuvre the aircraft itself.

However, depending on the desired implementation, it may be the case that these conventional aircraft do not have a high enough level of aerodynamic performance, and conventional aerodynamic features and mechanisms may not provide the level of control and manoeuvrability required of the aircraft.

Improved manoeuvrability is also desirable for other types of vehicles, such as boats and underwater vessels, and land vehicles.

SUMMARY

Aspects and examples of the invention are set out in the appended claims, and aim to address at least some of the above mentioned problems and/or related problems.

In one aspect there is provided a vehicle comprising a morphing wing and a body, wherein the vehicle is configured to transform from a first configuration into a second configuration for ascent or descent of the vehicle, wherein the drag force and lift force on the vehicle in the second configuration are less than in the first configuration; wherein transforming from the first to the second configuration comprises: contracting the wing within a geometric plane defined by the wing; and rotating the outer edge of the wing downwards, out of the geometric plane.

This may enhance the manoeuvrability of the vehicle, and may enable the vehicle to have different aerodynamic properties in different flying modes, e.g. it may provide a high speed yet stable configuration of the vehicle as it rapidly ascends and/or descends, in addition to a lower speed gliding configuration, and may enable the vehicle to transition between the two. It will be understood that the terms high/low lift and drag configurations mean that during operation of the vehicle, the second low lift, low drag configuration the vehicle has a both a lower drag and lower lift force acting upon it than in the first high lift, high drag configuration.

The vehicle may be an aircraft, for example an unmanned aerial vehicle (UAV). Alternatively or additionally, the vehicle may be a submarine or submersible vehicle.

The vehicle may be configured to hold the wing in the second configuration for the ascent or descent, for example for the duration of the ascent or descent.

Contracting the wing within the geometric plane may comprise at least one of: reducing the angle in the geometric plane between the outer edge of the wing and the body; and retracting the outer edge towards the body in the geometric plane. Contracting the wing within a geometric plane defined by the wing may comprise reducing the area of the wing.

The area of the wing may be maintained during rotation downwards out of the geometric plane, for example the total surface area of the wing may remain constant, e.g. rotation may be performed without extension, retraction or rotation of the wing in the geometric plane may occur as the outer edge is rotated downwards. This may be done by providing a rotations means, such as a hinge which is operable independently from the extension mechanism of the wing.

Rotating the outer edge downwards out of the geometric plane may comprise forming a fluid channel bounded on a first side by an under-surface of the wing and, on a second side opposite the first side, by the body. The width of the channel is less than or equal to the width of the body. In the second configuration, the height of the channel may be at least one of: less than or equal to the height of the body; and more than or equal to ¼ the height of the body.

Transforming the vehicle from the first configuration to the second configuration may comprise transforming the vehicle into an intermediate configuration in which the outer edge of the wing is in a retracted position in the geometric plane. For example in this configuration the wing may be substantially planar, as in the first configuration, but may have a reduced area in comparison to the first configuration.

The vehicle may be further configured to transform from the second configuration into the first configuration. For example, transforming from the second configuration into the first configuration may comprise transforming the vehicle into the intermediate configuration.

The wing may be connected to the body by a joint, such as a hinge, about which the wing is pivotable, for example pivotable out of the geometric plane of the wing, e.g. downwards and upwards towards an under surface or top surface of the body of the vehicle respectively. The wing may comprise an extension mechanism that itself comprises an extendable frame, that for example is connected to the body by the joint. The outer edge of the extendable frame may be rotatable from the body in the geometric plane of the wing.

The vehicle may further comprise an actuator for moving the wing, wherein the actuator may be connected at a first end to the body, and at a second end to the extendable frame. The actuator may be configured to rotate the outer edge of the extendable frame towards the body, retract the outer edge of the wing towards the body, and rotate the outer edge of the wing downwards, out of the geometric plane, to transform the vehicle from the first configuration to the second configuration.

The extendable frame may comprise a plurality of longitudinal beams connected to one another by connecting beams, for example each longitudinal beam may be connected to an adjacent longitudinal beam by a pair of connecting beams. The connecting beams may be pivotably connected to the longitudinal beams to enable the longitudinal beams to be brought together and moved apart so as to extend and contract the extendable frame in the geometric plane of the frame, for example in the direction perpendicular to the orientation of the longitudinal beams.

The connecting beams may be of equal length such that the extendable frame is configured to extend without rotation of the outer edge of the frame. Alternatively each pair of connecting beams may comprise one beam that is longer than the other, such that the frame is to splay as it extends, to rotate the outer edge of the wing in the geometric plane of the wing, as the extendable frame expands and contracts.

In the second configuration, the downward span of the wing towards the outer edge may be arc shaped. For example the arc may have a curvature of at least 30 degrees.

The wing may be attachable and/or detachable from the body.

At least a portion of a leading edge of the wing may be swept forward. For example as the front edge of the wing extends away from the body it may extend towards the front of the vehicle, e.g. the outermost point of the front edge of each wing may be further forward than the point at which it connects to the body. This may provide an upstream tip of the wing which may channel air towards the body when the vehicle is in flight. For example this may direct air into the fluid channel provided between wing and the body.

The vehicle may further comprise at least one fan configured to provide thrust for the vehicle. For example the at least one fan may be arranged in at least one additional channel within the body (e.g. channels provided in addition to the fluid channels formed between the wings and the body), the at least one channel extending from a front surface of the body to a rear surface of the body. The fan may be a ducted fan for example an electric ducted fan, or alternatively a propeller.

The vehicle may further comprise at least one compartment or cavities, for example for receiving a payload (e.g. for delivery to a target site). For example the vehicle may comprise two such compartments. At least one of the compartments may comprise a compartment for a net, for example in which a net can be stored and deployed from, and then subsequently retracted to capture an object from a target site.

The vehicle may further comprise a controller, for example for controlling operations of the actuators and fans. The controller may be arranged in the body of the vehicle, and may be powered by a battery also arranged within the body. The vehicle may also comprise a camera for example for viewing the external environment around the vehicle. The camera may be connected to transmitter means for transmitting the images it captures to an operator on the ground and/or storage means for storing the image data it obtains. The controller may control operation of the camera and/or obtain image data from it.

The vehicle may be an unmanned aerial vehicle.

In one aspect there is provided a method of morphing a wing of an vehicle, the vehicle also comprising a body, the method comprising transforming the wing from a first, into a second configuration for ascent or descent of the vehicle; wherein the drag force and lift force on the vehicle in the second configuration are less than in the first configuration; and holding the wing in the second configuration for the ascent or descent; wherein transforming from the first to the second configuration comprises: contracting the wing within a geometric plane defined by the wing; and rotating the outer edge of the wing downwards, out of the geometric plane. The method may further comprise holding the wing in the second configuration for the ascent or descent, for example for the duration of the ascent or descent.

Contracting the wing within the geometric plane may comprise at least one of: reducing the angle in the geometric plane between the outer edge of the wing and the body; and, retracting the outer edge towards the body in the geometric plane.

Transforming from the first to the second configuration may comprise steps of: first, reducing the angle in the geometric plane between the outer edge of the wing and the body and retracting the outer edge towards the body in the geometric plane; and then, rotating the outer edge of the wing downwards, out of the geometric plane.

In one aspect there is provided a method of controlling a wing for an vehicle, the method comprising moving the wing from a first, high lift, high drag configuration, into a second, low lift low drag configuration for ascent or descent of the vehicle, for example for performing a stooping dive; and holding the wing in the second configuration for the ascent or descent; and moving the wing comprises rotating the outer edge of the wing downwards and towards an under-surface of the body. For example, the method may comprise holding the wing in said second configuration for the duration of an ascent or descent, and may comprise transitioning the wing into a high lift high drag configuration, e.g. the first configuration, once the vehicle ascent/descent is completed. This may enable the vehicle to transition quickly between different flight modes with different aerodynamic properties. This may enhance the manoeuvrability of the vehicle, and may provide a high speed yet stable configuration of the vehicle as it rapidly ascends and/or descends.

The wing may comprise an inner edge connected to a body of the vehicle, and the outer edge is positioned externally of the body, to define a wingspan; and in the first configuration the wing may have a planar wingspan, such that moving the wing into the second configuration comprises rotating the outer edge of the wing out of the geometric plane of the wingspan.

Moving the wing into the second configuration may comprise forming a fluid channel bounded on a first side by an under-surface of the wing and, on a second side opposite the first side, by a portion of the body. This may reduce the drag on the vehicle.

The outer edge of the wing may be extendable and retractable from the body in the geometric plane, and moving the wing may comprise moving the outer edge of the wing within the geometric plane of the wingspan. Moving the wing from the first configuration to the second configuration may comprise moving the wing into an intermediate configuration in which the outer edge of the wing is retracted in the geometric plane of the wingspan.

The method may further comprise moving the wing from the second configuration into the first configuration, for example via the intermediate configuration. Moving via the intermediate configuration may enable the vehicle to remain stable while it transitions between the two other configurations with potentially large differences in aerodynamic properties, such as the drag and lift forces acting on the vehicle.

Moving the wing into the intermediate configuration may comprise moving a leading edge of the wing forward.

The vehicle may comprise an actuator connected between the body and the wing, and moving the wing may comprise causing the actuator to apply a force on the wing.

The vehicle may comprise a hinge, arranged between the inner edge of the wing and the body, about which the wing is pivotable.

The wing may comprise a frame that is extendable in the geometric plane. The actuator may be connected to the hinge and the extendable frame, and moving the wing may comprise causing the actuator to apply a force to rotate the wing and to extend the frame.

In the second configuration, the outer edge of the wing may be positioned down the height of the body relative to the inner edge.

In the second configuration, the wingspan between the inner and outer edges of the wing may be arc shaped, for example the arc may have a curvature of at least 30 degrees.

In the second configuration, the surface area of an inner surface of the wing may be at least 20% of the area of a side of the body connected to the wing.

The vehicle may be an unmanned aerial vehicle.

A controller for controlling a wing for an vehicle may be provided to perform the methods described herein. An vehicle, for example an unmanned aerial vehicle such as the vehicle described herein, may comprise the controller.

In one aspect there is provided an vehicle comprising a body and a wing, wherein the wing is connected to the body and wherein, in a low lift low drag configuration of the vehicle the wing comprises an inner edge connected to the body, and an outer edge positioned outwardly from the body to define a wingspan therebetween, and wherein the wing is shaped to define a fluid channel bounded on a first side by an under-surface of the wing and, on a second side opposite the first side, by a portion of the body; and wherein the fluid channel is arranged to provide a path for fluid to flow through the channel as the vehicle travels through the fluid to produce a lift force on the vehicle.

The present disclosure may provide a method of controlling such an vehicle, for example to dive or climb. The method may comprise controlling the wing of this vehicle by moving the wing from a first configuration (such as the high lift, high drag mentioned above) into a second configuration (in which the lift provided by the wing and or the drag provided by the wing may be lower relative to the first configuration). This second configuration may be used for the dive or climb, e.g. to provide rapid ascent or descent of the vehicle. The method comprises holding the wing in the second configuration for the ascent or descent and moving the wing comprises rotating the outer edge of the wing downwards, and towards an under-surface of the body. The wing of this vehicle may be controlled according to any one or more of the methods described or claimed herein.

In the second configuration, the wing may be cupped to provide the fluid channel. In the second configuration, the outer edge of the wing may be positioned lower than the inner edge (for example lower down the height of the body relative to the inner edge). In the configuration, the wingspan between the inner and outer edges may be curved, for example it may be arc shaped. The wing (e.g. the arc) may have a curvature of at least 30 degrees.

In the low lift low drag configuration, the area of the wing span between the inner edge and the outer edge may be greater than at least 20% of an area of a side of the body, for example of a side of the body connected to the wing.

To provide the rotating motion, the wing may be pivotable relative the body. For example, the vehicle may comprise a hinge, arranged between the inner edge of the wing and the body, about which the wing may be pivotable.

The wing may be extendable (e.g. to increase its length) thereby to move the outer edge of the wing away from the vehicle in the geometric plane of the vehicle's wings. One way to achieve this is that the wing may comprise an extendable frame.

The vehicle may comprise an actuator connected to the body and the wing, and the actuator may be configured to apply a force to the wing (e.g. by providing a moment about the hinge) to rotate the wing downward or upward relative to the body.

The actuator may be configured to adjust the position of the outer edge of the wing relative to the body. For example, the actuator may be configured to outwardly extend and/or inwardly retract the extendable frame. For example the actuator may be configured to expand and/or retract the frame. The frame may have a compressible structure, for example it may be articulated, for example it may comprise a plurality of interconnected rods that provide a folding structure.

The actuator may be connected to the hinge and the extendable frame, for applying said force to rotate the wing and to extend the frame. This may enable the same actuator to provide both the extending and rotating movement of the wing.

The wing may comprise a plurality of adjacent elements arranged between the inner and outer edges, and each element may be moveable relative to each other element. For example they may be mutually connected by pivoting couplings, such as in the manner of lazy-tongs. The adjacent elements may partially overlap with one another in the direction between the inner and outer edges of the wing. The elements comprise at least one of, feather-like elements, and plate-like elements.

In one aspect there is provided a method of controlling a wing for a vehicle, wherein the wing is pivotably connected at an inner edge to a body of a vehicle, and further comprises an outer edge positioned outwardly from the body and down the body from the inner edge; wherein the method comprises rotating the wing between a low lift low drag configuration, in which the wing defines a fluid channel bounded on a first side by an under-surface of the wing and, on a second side opposite the first side, by a portion of the body; and the fluid channel is arranged to provide a path for fluid to flow through the channel as the vehicle travels through the fluid to produce a lift force on the vehicle; and a high lift high drag position in which the angle between the wing and the body is reduced in comparison to the first position.

In one aspect there is provided an apparatus for controlling the wing of a vehicle, wherein the wing is pivotably connected to a body of a vehicle, and the apparatus is configured to rotate the wing between a low lift low drag configuration, in which the wing defines a fluid channel bounded on a first side by an under-surface of the wing and, on a second side opposite the first side, by a portion of the body; and the fluid channel is arranged to provide a path for fluid to flow through the channel as the vehicle travels through the fluid to produce a lift force on the vehicle; and a high lift high drag configuration in which the angle between the wing and the body is reduced in comparison to the first position.

The outer edge of the wing may be outwardly extendable from the body, and the apparatus may be further configured to at least one of extend and retract the outer edge of the wing, for example in the geometric plane defined by the wing in the high lift high drag configuration.

In one aspect there is provided an aircraft comprising a morphing wing and a body, wherein the aircraft is configured to transform from a first configuration into a second configuration for ascent or descent of the aircraft, wherein the drag force and lift force on the aircraft in the second configuration are less than in the first configuration; wherein transforming from the first to the second configuration comprises: contracting the wing within a geometric plane defined by the wing; and rotating the outer edge of the wing downwards, out of the geometric plane.

This may enhance the manoeuvrability of the aircraft, and may enable the aircraft to have different aerodynamic properties in different flying modes, e.g. it may provide a high speed yet stable configuration of the aircraft as it rapidly ascends and/or descends, in addition to a lower speed gliding configuration, and may enable the aircraft to transition between the two. It will be understood that the terms high/low lift and drag configurations mean that during operation of the aircraft, the second low lift, low drag configuration the aircraft has a both a lower drag and lower lift force acting upon it than in the first high lift, high drag configuration.

The aircraft may be configured to hold the wing in the second configuration for the ascent or descent, for example for the duration of the ascent or descent.

Contracting the wing within the geometric plane may comprise at least one of: reducing the angle in the geometric plane between the outer edge of the wing and the body; and retracting the outer edge towards the body in the geometric plane. Contracting the wing within a geometric plane defined by the wing may comprise reducing the area of the wing.

The area of the wing may be maintained during rotation downwards out of the geometric plane, for example the total surface area of the wing may remain constant, e.g. rotation may be performed without extension, retraction or rotation of the wing in the geometric plane may occur as the outer edge is rotated downwards. This may be done by providing a rotations means, such as a hinge which is operable independently from the extension mechanism of the wing.

Rotating the outer edge downwards out of the geometric plane may comprise forming a fluid channel bounded on a first side by an under-surface of the wing and, on a second side opposite the first side, by the body. The width of the channel is less than or equal to the width of the body. In the second configuration, the height of the channel may be at least one of: less than or equal to the height of the body; and more than or equal to ¼ the height of the body.

Transforming the aircraft from the first configuration to the second configuration may comprise transforming the aircraft into an intermediate configuration in which the outer edge of the wing is in a retracted position in the geometric plane. For example in this configuration the wing may be substantially planar, as in the first configuration, but may have a reduced area in comparison to the first configuration.

The aircraft may be further configured to transform from the second configuration into the first configuration. For example, transforming from the second configuration into the first configuration may comprise transforming the aircraft into the intermediate configuration.

The wing may be connected to the body by a joint, such as a hinge, about which the wing is pivotable, for example pivotable out of the geometric plane of the wing, e.g. downwards and upwards towards an under surface or top surface of the body of the aircraft respectively. The wing may comprise an extension mechanism that itself comprises an extendable frame, that for example is connected to the body by the joint. The outer edge of the extendable frame may be rotatable from the body in the geometric plane of the wing.

The aircraft may further comprise an actuator for moving the wing, wherein the actuator may be connected at a first end to the body, and at a second end to the extendable frame. The actuator may be configured to rotate the outer edge of the extendable frame towards the body, retract the outer edge of the wing towards the body, and rotate the outer edge of the wing downwards, out of the geometric plane, to transform the aircraft from the first configuration to the second configuration.

The extendable frame may comprise a plurality of longitudinal beams connected to one another by connecting beams, for example each longitudinal beam may be connected to an adjacent longitudinal beam by a pair of connecting beams. The connecting beams may be pivotably connected to the longitudinal beams to enable the longitudinal beams to be brought together and moved apart so as to extend and contract the extendable frame in the geometric plane of the frame, for example in the direction perpendicular to the orientation of the longitudinal beams.

The connecting beams may be of equal length such that the extendable frame is configured to extend without rotation of the outer edge of the frame. Alternatively each pair of connecting beams may comprise one beam that is longer than the other, such that the frame is to splay as it extends, to rotate the outer edge of the wing in the geometric plane of the wing, as the extendable frame expands and contracts.

In the second configuration, the downward span of the wing towards the outer edge may be arc shaped. For example the arc may have a curvature of at least 30 degrees.

The wing may be attachable and/or detachable from the body.

At least a portion of a leading edge of the wing may be swept forward. For example as the front edge of the wing extends away from the body it may extend towards the front of the aircraft, e.g. the outermost point of the front edge of each wing may be further forward than the point at which it connects to the body. This may provide an upstream tip of the wing which may channel air towards the body when the aircraft is in flight. For example this may direct air into the fluid channel provided between wing and the body.

The aircraft may further comprise at least one fan configured to provide thrust for the aircraft. For example the at least one fan may be arranged in at least one additional channel within the body (e.g. channels provided in addition to the fluid channels formed between the wings and the body), the at least one channel extending from a front surface of the body to a rear surface of the body. The fan may be a ducted fan for example an electric ducted fan, or alternatively a propeller.

The aircraft may further comprise at least one compartment or cavities, for example for receiving a payload (e.g. for delivery to a target site). For example the aircraft may comprise two such compartments. At least one of the compartments may comprise a compartment for a net, for example in which a net can be stored and deployed from, and then subsequently retracted to capture an object from a target site.

The aircraft may further comprise a controller, for example for controlling operations of the actuators and fans. The controller may be arranged in the body of the aircraft, and may be powered by a battery also arranged within the body. The aircraft may also comprise a camera for example for viewing the external environment around the aircraft. The camera may be connected to transmitter means for transmitting the images it captures to an operator on the ground and/or storage means for storing the image data it obtains. The controller may control operation of the camera and/or obtain image data from it.

The aircraft may be an unmanned aerial vehicle.

In one aspect there is provided a method of morphing a wing of an aircraft, the aircraft also comprising a body, the method comprising transforming the wing from a first, into a second configuration for ascent or descent of the aircraft; wherein the drag force and lift force on the aircraft in the second configuration are less than in the first configuration; and holding the wing in the second configuration for the ascent or descent; wherein transforming from the first to the second configuration comprises: contracting the wing within a geometric plane defined by the wing; and rotating the outer edge of the wing downwards, out of the geometric plane. The method may further comprise holding the wing in the second configuration for the ascent or descent, for example for the duration of the ascent or descent.

Contracting the wing within the geometric plane may comprise at least one of: reducing the angle in the geometric plane between the outer edge of the wing and the body; and, retracting the outer edge towards the body in the geometric plane.

Transforming from the first to the second configuration may comprise steps of: first, reducing the angle in the geometric plane between the outer edge of the wing and the body and retracting the outer edge towards the body in the geometric plane; and then, rotating the outer edge of the wing downwards, out of the geometric plane.

In one aspect there is provided a method of controlling a wing for an aircraft, the method comprising moving the wing from a first, high lift, high drag configuration, into a second, low lift low drag configuration for ascent or descent of the aircraft, for example for performing a stooping dive; and holding the wing in the second configuration for the ascent or descent; and moving the wing comprises rotating the outer edge of the wing downwards and towards an under-surface of the body. For example, the method may comprise holding the wing in said second configuration for the duration of an ascent or descent, and may comprise transitioning the wing into a high lift high drag configuration, e.g. the first configuration, once the aircraft ascent/descent is completed. This may enable the aircraft to transition quickly between different flight modes with different aerodynamic properties. This may enhance the manoeuvrability of the aircraft, and may provide a high speed yet stable configuration of the aircraft as it rapidly ascends and/or descends.

The wing may comprise an inner edge connected to a body of the aircraft, and the outer edge is positioned externally of the body, to define a wingspan; and in the first configuration the wing may have a planar wingspan, such that moving the wing into the second configuration comprises rotating the outer edge of the wing out of the geometric plane of the wingspan.

Moving the wing into the second configuration may comprise forming a fluid channel bounded on a first side by an under-surface of the wing and, on a second side opposite the first side, by a portion of the body. This may reduce the drag on the aircraft.

The outer edge of the wing may be extendable and retractable from the body in the geometric plane, and moving the wing may comprise moving the outer edge of the wing within the geometric plane of the wingspan. Moving the wing from the first configuration to the second configuration may comprise moving the wing into an intermediate configuration in which the outer edge of the wing is retracted in the geometric plane of the wingspan.

The method may further comprise moving the wing from the second configuration into the first configuration, for example via the intermediate configuration. Moving via the intermediate configuration may enable the aircraft to remain stable while it transitions between the two other configurations with potentially large differences in aerodynamic properties, such as the drag and lift forces acting on the aircraft.

Moving the wing into the intermediate configuration may comprise moving a leading edge of the wing forward.

The aircraft may comprise an actuator connected between the body and the wing, and moving the wing may comprise causing the actuator to apply a force on the wing.

The aircraft may comprise a hinge, arranged between the inner edge of the wing and the body, about which the wing is pivotable.

The wing may comprise a frame that is extendable in the geometric plane. The actuator may be connected to the hinge and the extendable frame, and moving the wing may comprise causing the actuator to apply a force to rotate the wing and to extend the frame.

In the second configuration, the outer edge of the wing may be positioned down the height of the body relative to the inner edge.

In the second configuration, the wingspan between the inner and outer edges of the wing may be arc shaped, for example the arc may have a curvature of at least 30 degrees.

In the second configuration, the surface area of an inner surface of the wing may be at least 20% of the area of a side of the body connected to the wing.

The aircraft may be an unmanned aerial vehicle.

A controller for controlling a wing for an aircraft may be provided to perform the methods described herein. An aircraft, for example an unmanned aerial vehicle such as the aircraft described herein, may comprise the controller.

In one aspect there is provided an aircraft comprising a body and a wing, wherein the wing is connected to the body and wherein, in a low lift low drag configuration of the aircraft the wing comprises an inner edge connected to the body, and an outer edge positioned outwardly from the body to define a wingspan therebetween, and wherein the wing is shaped to define a fluid channel bounded on a first side by an under-surface of the wing and, on a second side opposite the first side, by a portion of the body; and wherein the fluid channel is arranged to provide a path for fluid to flow through the channel as the aircraft travels through the fluid to produce a lift force on the aircraft.

The present disclosure may provide a method of controlling such an aircraft, for example to dive or climb. The method may comprise controlling the wing of this aircraft by moving the wing from a first configuration (such as the high lift, high drag mentioned above) into a second configuration (in which the lift provided by the wing and or the drag provided by the wing may be lower relative to the first configuration). This second configuration may be used for the dive or climb, e.g. to provide rapid ascent or descent of the aircraft. The method comprises holding the wing in the second configuration for the ascent or descent and moving the wing comprises rotating the outer edge of the wing downwards, and towards an under-surface of the body. The wing of this aircraft may be controlled according to any one or more of the methods described or claimed herein.

In the second configuration, the wing may be cupped to provide the fluid channel. In the second configuration, the outer edge of the wing may be positioned lower than the inner edge (for example lower down the height of the body relative to the inner edge). In the configuration, the wingspan between the inner and outer edges may be curved, for example it may be arc shaped. The wing (e.g. the arc) may have a curvature of at least 30 degrees.

In the low lift low drag configuration, the area of the wing span between the inner edge and the outer edge may be greater than at least 20% of an area of a side of the body, for example of a side of the body connected to the wing.

To provide the rotating motion, the wing may be pivotable relative the body. For example, the aircraft may comprise a hinge, arranged between the inner edge of the wing and the body, about which the wing may be pivotable.

The wing may be extendable (e.g. to increase its length) thereby to move the outer edge of the wing away from the aircraft in the geometric plane of the aircraft's wings. One way to achieve this is that the wing may comprise an extendable frame.

The aircraft may comprise an actuator connected to the body and the wing, and the actuator may be configured to apply a force to the wing (e.g. by providing a moment about the hinge) to rotate the wing downward or upward relative to the body.

The actuator may be configured to adjust the position of the outer edge of the wing relative to the body. For example, the actuator may be configured to outwardly extend and/or inwardly retract the extendable frame. For example the actuator may be configured to expand and/or retract the frame. The frame may have a compressible structure, for example it may be articulated, for example it may comprise a plurality of interconnected rods that provide a folding structure.

The actuator may be connected to the hinge and the extendable frame, for applying said force to rotate the wing and to extend the frame. This may enable the same actuator to provide both the extending and rotating movement of the wing.

The wing may comprise a plurality of adjacent elements arranged between the inner and outer edges, and each element may be moveable relative to each other element. For example they may be mutually connected by pivoting couplings, such as in the manner of lazy-tongs. The adjacent elements may partially overlap with one another in the direction between the inner and outer edges of the wing. The elements comprise at least one of, feather-like elements, and plate-like elements.

In one aspect there is provided a method of controlling a wing for a vehicle, wherein the wing is pivotably connected at an inner edge to a body of a vehicle, and further comprises an outer edge positioned outwardly from the body and down the body from the inner edge; wherein the method comprises rotating the wing between a low lift low drag configuration, in which the wing defines a fluid channel bounded on a first side by an under-surface of the wing and, on a second side opposite the first side, by a portion of the body; and the fluid channel is arranged to provide a path for fluid to flow through the channel as the aircraft travels through the fluid to produce a lift force on the aircraft; and a high lift high drag position in which the angle between the wing and the body is reduced in comparison to the first position.

In one aspect there is provided an apparatus for controlling the wing of a vehicle, wherein the wing is pivotably connected to a body of a vehicle, and the apparatus is configured to rotate the wing between a low lift low drag configuration, in which the wing defines a fluid channel bounded on a first side by an under-surface of the wing and, on a second side opposite the first side, by a portion of the body; and the fluid channel is arranged to provide a path for fluid to flow through the channel as the aircraft travels through the fluid to produce a lift force on the aircraft; and a high lift high drag configuration in which the angle between the wing and the body is reduced in comparison to the first position.

The outer edge of the wing may be outwardly extendable from the body, and the apparatus may be further configured to at least one of extend and retract the outer edge of the wing, for example in the geometric plane defined by the wing in the high lift high drag configuration.

The outer edge may be the edge of the wing positioned externally of the body, for example the edge of the wing not on the body and/or not directly connected to the body.

The outer edge of the wing may be the portion of the wing comprising the outermost point of the wing, e.g. the point furthest from the body, for example the point furthest from the inner edge of the wing connected to the body. The outer edge of the wing may be the portion of the wing comprising the outermost point of the wing in at least one of the first configuration, the second configuration, and the intermediate configuration. The outer edge of the wing may be the leading edge of the wing. The outer edge may be provided by a wing cover, for example an edge of a wing cover.

Each of the foregoing aspects may be further refined as set out in the examples described herein. Aspects of the disclosure may be provided in conjunction with each other, and features of one aspect may be applied to other aspects.

BRIEF DESCRIPTION OF DRAWINGS

Embodiments of the disclosure will now be described with reference to the accompanying drawings, in which:

FIGS. 3A-C illustrate the aircraft with wings in different configurations;

FIGS. 8A and 8B illustrate example frames for a wing of an aircraft.

In the drawings like reference numerals are used to indicate like elements.

SPECIFIC DESCRIPTION

Described herein with reference to the figures are vehicles having particular wing configurations and shapes, which may improve the aerodynamic efficiency and manoeuvrability of the vehicle. Also described herein are methods for controlling such wings, including altering the shape of the wing, e.g. whilst the vehicle is travelling, which may improve performance and provide different aerodynamic properties of the vehicle for different modes of operation of the vehicle. The enhanced manoeuvrability and aerodynamic properties of such aircraft may enable their use in fields such as counter-UAS technology, for example to aid in the disruption or destruction of other aircraft.

Figure 1A:
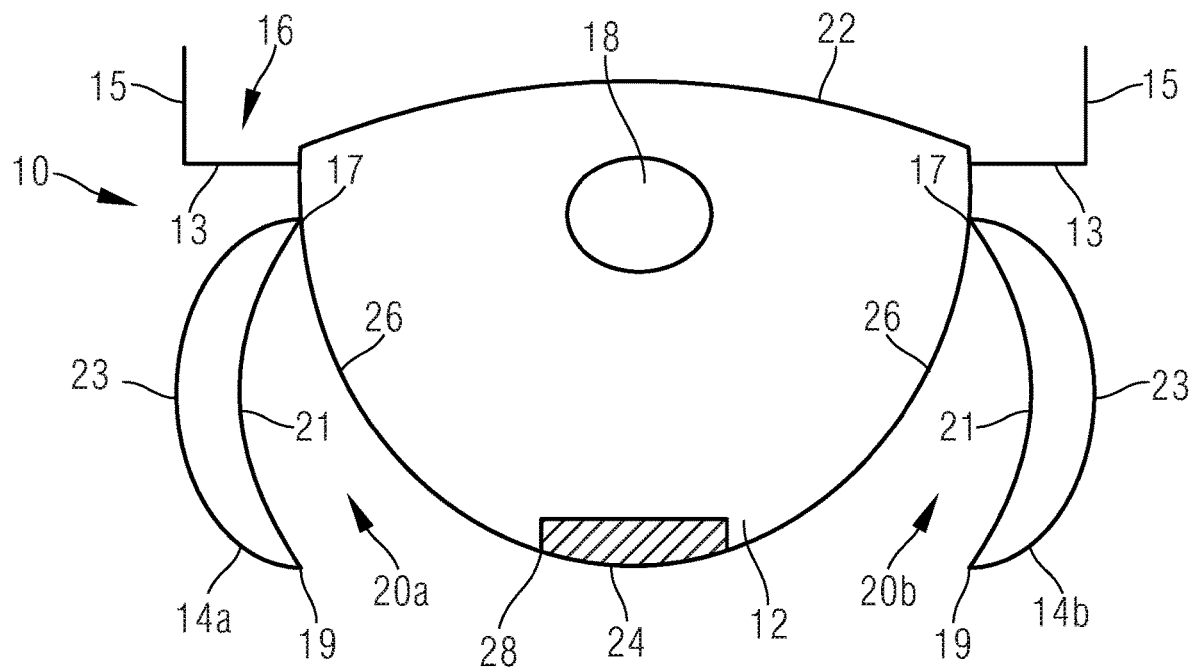
FIGS. 1A-B illustrate an example aircraft having a pair of static wings.
Figure 1B:
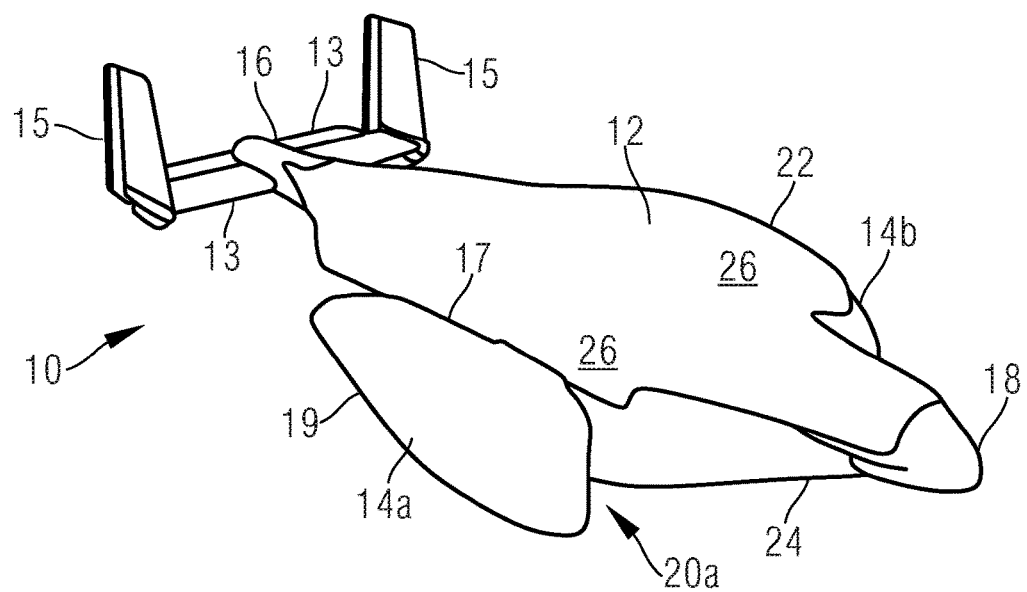

FIG. 1A illustrates a cross-sectional front view of an example aircraft 10, in particular an unmanned aerial vehicle. FIG. 1B gives a perspective view of the same aircraft 10. Aircraft 100 comprises a body 12 that has a substantially tubular shape. The body 12 is connected at its back end to a tail section 16, and at its front end to a nose section 18. The body 12 narrows towards the tail section 16 and towards the nose section 18, and is laterally symmetrical about its central axis. The body 12 has a top surface 22, a bottom surface 24, and 2 curved side surfaces 26 that connect the top surface 22 to the bottom surface 24. The bottom surface 24 and top surface 22 are also curved. The body 12 also comprises a payload space 28 at the bottom surface which may receive a payload for example to deliver to a target. Such a payload may comprise, a pyrotechnic or other explosive device, a net deployer or a signal jamming payload.

The nose section 18 is arranged at the front of the aircraft 100 and is connected to the front of the body 22. The nose section is substantially conically shaped with a rounded tip provided at the front end of the aircraft 10. The tail section 16 is arranged at the rear of the aircraft 10 and is connected to the back of the body 22. The tail section 16 comprises a pair of lateral fins 13 that extend either side of the body 12, and each of the lateral fins 13 is connected at its respective outer edge to a vertical fin 15 that extends vertical upwardly from the outer edge of the lateral fins 13. In operation, while the aircraft is flying, the tail section acts to stabilise the aircraft 100.

The aircraft further comprises a pair of wings 14a, 14b, connected to the body at a point along the side surfaces 26a, 26b. The wings 14a, 14b are fixedly connected to the body 12 at along the side of each side surface 26. In particular the wings 14a, 14b comprise an inner edge 17 that connects along its length to one of the side surfaces 26 of the body 12. Each of the wings 14a,b also comprise an outer edge 19 that is positioned outwardly from the body 12 and which is positioned down the height of the body 12 from the inner edge 17. A wingspan is thereby defined between the inner edge 17 and the outer edge 19. This wingspan extends over at least 30% of the height of the side surface 26 of the body 12, for example at least 40%, for example at least 50%. The wings 14 further comprise an under-surface 21 that faces towards the body 12, and a top surface 23 facing away from the body 12, wherein each surface connects the inner edge 17 to the outer edge 19 of the wing. The inner surface 21 of the wing is curved so as to provide an arc-shape to the wing 14. This arc is shaped such that it has a curvature of at least 30 degrees. Due to the respective shapes of the wing 14 and the body 12, a fluid channel 20a, 20b is provided between each wing 14a, 14b and the body. During operation of the aircraft 10, that is, while the aircraft 10 is flying, the fluid channels 20 provide a path for air to flow through the channel. The flow of air through the channel 20 minimises the drag force experienced by the aircraft 10, thereby enabling the aircraft 10 to travel stably at high speed, for example during a rapid ascent or descent (e.g. swooping) of the aircraft 10. The air flow may also produce a lift force on the aircraft 10.

The channels 20 defined between each wing 14 and the body 12 have a width, e.g. a greatest width, which is less than the total greatest width of the body. For example the channel may have a width less than half that of the body. This may enable each wing 14 to channel a flow of air close to the body 12 when the aircraft 10 is flying, thereby improving the aerodynamic efficiency of the aircraft 10 and further reducing drag.

The channels 20 are less than or equal to the height of the body. In examples other than that shown in FIG. 1A, each wing 14 may extend from the top of the body 12, such that a channel is defined down the entire height of the body. The wings 14 shown extend no lower than the lowest extent of the body 12, for example to minimize the upstream edge of the wing and limit drag. However, the wings 14 may in some examples extend below the body 12. The vertical extent of the wing, and thereby the height of the channel, may be at least ¼ the height of the body, for example at least ½ the height of the body.

It will be understood that the curvature, size and positioning of the wings 14 shown in FIG. 1A are merely exemplary, and that the wings and therefore the channels formed between the wings and the body may have many different shapes and sizes in different examples.

The aircraft may comprise one or more fans (not shown), such as a ducted fan, to generate thrust for the aircraft. The fans may be powered electrically from a power source arranged within the body 12 of the aircraft 10, and may be arranged in channel(s) in the body 12 that extend from a front surface of the aircraft to a rear surface to provide an air flow path. For example two channels containing such fans may extend through the body 12 each having inlets at a front face of the body below the nose section 18, and arranged symmetrically either side of the longitudinal axis of the aircraft 10. Providing the fans in such an arrangement may enable thrust to be provided to the aircraft whilst maintaining the aerodynamic shape of the aircraft, and without interfering with the air flow through the channels 20 between the wings 23 and the body 12.

The aircraft may alternatively comprise a propeller, or multiple propellers, that generate thrust for the aircraft 10. The propeller can be connected either to the nose section 18 or the tail section 16 of the aircraft 10. The propeller is connected to and powered by a power source contained within the body 12 of the aircraft 10. The propeller may preferably be provided at the tail section 16 so as to minimize interference with the air flow through the fluid channels 20.

The aircraft 10 also comprises a guidance system that comprises a system of cameras and avionics (not shown) that enable the aircraft 10 to be manoeuvred remotely.

Figure 2A:
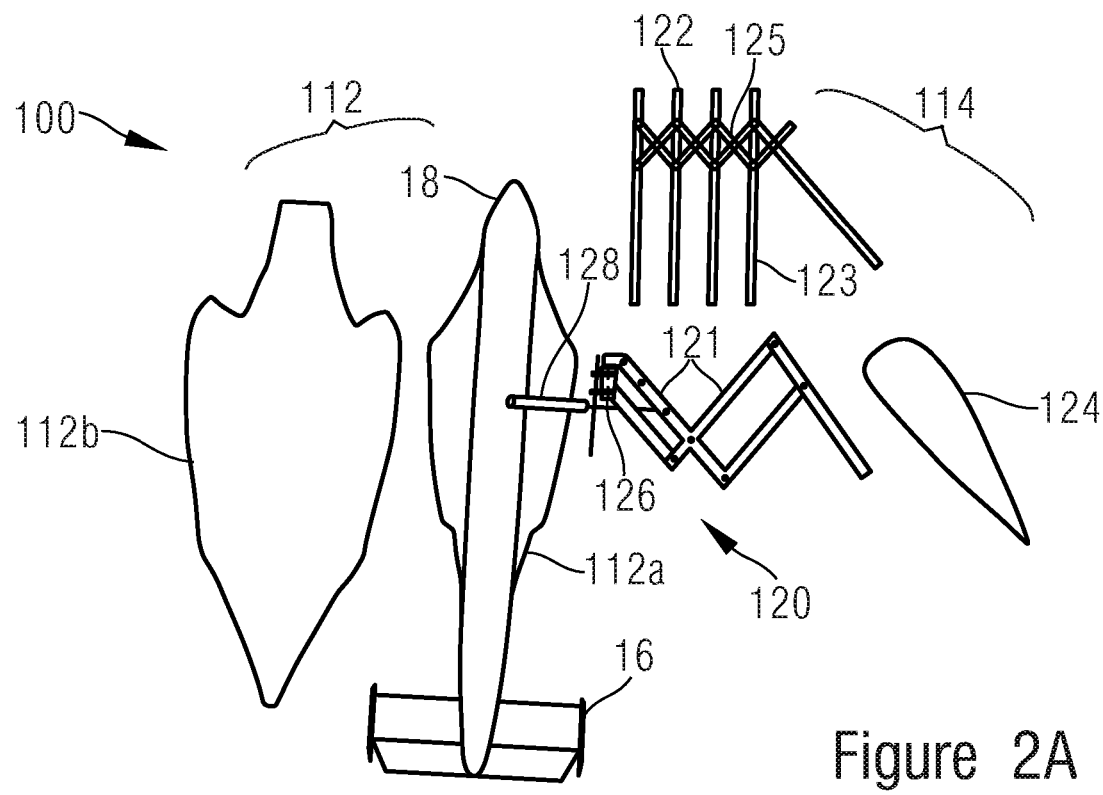
FIGS. 2A-B illustrate an example aircraft comprising a pair of moveable wings.
Figure 2B:
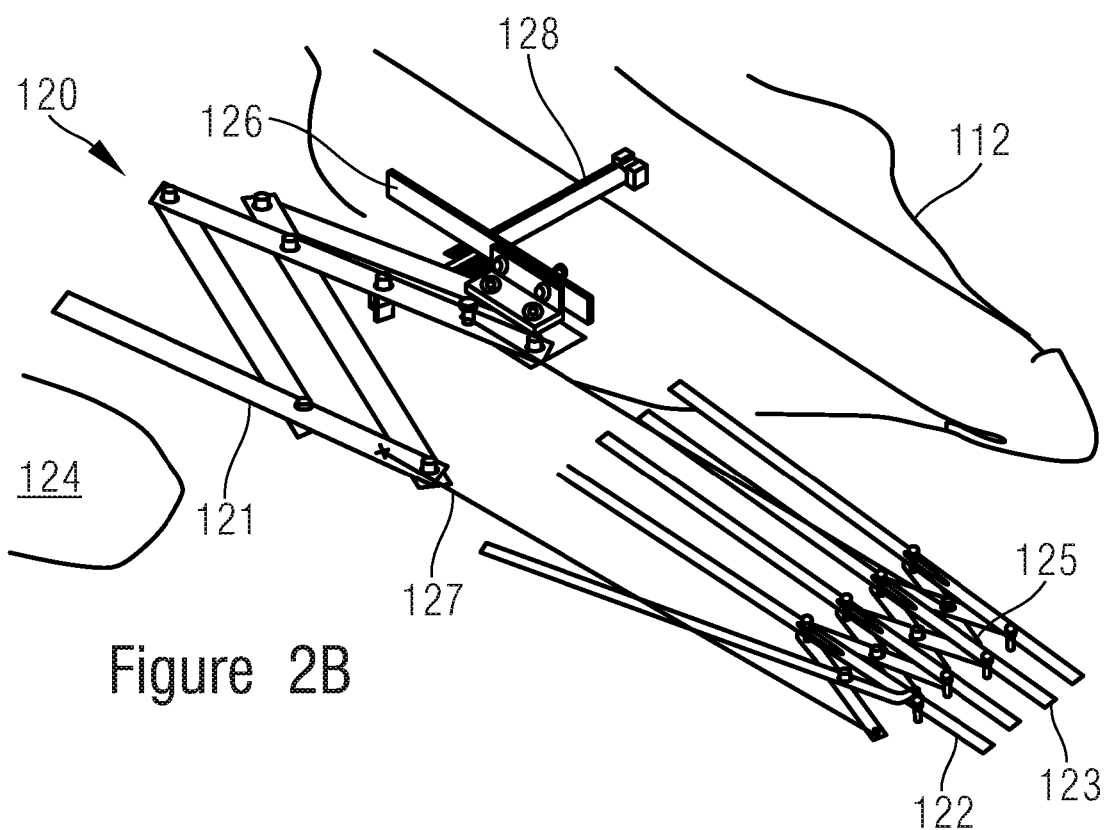

FIGS. 2A and 2B illustrate the component parts of an aircraft 100 that has a pair of moveable wings 114 and a mechanism for moving and/or altering the shape of the wings. The aircraft 100 comprises a body 112 with a structure substantially the same as the body 12 described with reference to FIG. 1. However, the body 112 of the aircraft 100 is formed of two connectable parts, fuselage 112a and cover 112b. The fuselage 112a extends from a nose section 18 to a tail section 16, wherein the nose section 18 and tail section 16 are as described with reference to the aircraft 10 of FIG. 1. The fuselage 112a is substantially tubular in shape, but the width of a lower portion of the fuselage 112a is increased in a middle section between the nose 18 and tail 16 sections. The body 112 further comprises an aerodynamically shaped cover 112b for positioning over the fuselage 11a.

The aircraft 100 comprises a moveable wing 114, the structure of which is shown clearly in FIG. 2B. The moveable wing 114 comprises an extension frame 120 and a support frame 122. The extension frame 120 comprises an articulated structure of interconnected beams 121. The extension frame 120 is extendable and compressible such that an outer edge of the wing is moveable towards and away from an inner edge of the wing and the body 112. The extension frame 120 is connected to an actuator 128, which is also connected to the body 112. The extension frame 120 is further pivotably connected to the body via a 90 degree hinge 126. The actuator 128 is a linear actuator, but in other examples the aircraft may comprise "rack and pinion" or piston type actuator. The actuator 128 is powered by an electrical machine (such as a motor) which may be located within the body (not shown). For example, a rod or other mechanical linkage may connect the actuator to the frame via an inlet in the body 112. The actuator is operable to provide an outward force to the extension frame 120 to rotate the extension frame 120 about the hinge 126 and to extend the extension frame 120 (described in more detail with reference to FIG. 3). As shown in FIG. 2B the actuator 18 is connected to the extension frame 120 at an underside of the extension frame 120, and below the hinge. This enables a single actuator, upon application of an outward force to the frame 120, to first fully rotate the wing 114 upwards, and, upon continuation of the application of the force, to then cause extension of the extension frame 120 itself. Furthermore, as described in more detail below, in extending the extension frame 120, the actuator provides in-plane rotation of the outer edge of the wing 114.

The wing 114 further comprises a support frame 122 and a wing cover 124. The support frame 122 is connected to the extension frame 120 by connectors 127, and is arranged to sit on top of the extension frame 120 in operation. The support frame 122 also comprises an articulated structure that comprises a plurality of adjacent longitudinal beams 123 that are connected together by connecting beams 125. As such the support frame 122 is also extendable and compressible, and when connected to the extension frame 120 is configured to extend with the extension frame 120 as it is extended by the actuator 128. The outermost longitudinal beam 123 is also rotatable in the geometric plane defined by the wing, such that upon full extension by the actuator 128, that beam rotates (e.g. kicks or sweeps) outward relative to the other beams of the support frame 122 as shown in FIG. 2A. The outer edge of the wing 114 provided by the wing cover 124 is thus rotatable away from and towards the body in the plane of the wing as the frame extends and retracts respectively, upon operation of the actuator 128. The total area of the wing 114 is therefore variable, and can be increased and decreased due to the in-plane extension and retraction of the frame, and the rotation of the outer edge.

In some examples the actuator may have an in-built sensor that is configured to measure the forces applied by the actuator to the wing and/or the forces applied to wing or to the actuator itself. This information can be provided to a controller that controls operation of the actuators (described in more detail below), for example so that operation of the actuators may be controlled based on environmental conditions. For example, in different modes of flight the forces acting on the aircraft as a whole, and in particular on the wing and actuator may vary—e.g. based on the speed, acceleration, orientation of the aircraft, or the position of the wing. For example, during operation there may be times where operation of the actuator would be unsafe or would cause the aircraft to become unstable, due to the forces acting on the aircraft.

The wing cover 124 is configured so that it can be placed over the support frame 122. In particular the wing cover is attached to the outer edge of the support frame 122. The wing cover is shaped such that, when the wing 122 is fully rotated downwards on the hinge 126, the shape of the wing is substantially the same as that described for the fixed wing 14 with reference to FIG. 1. That is, the curvature of the wing 114, and the flow channels provided between each wing 114 and the body 112 are substantially as described above.

The aircraft 100 further comprises ducted fans powered electrically and arranged in fluid channels within the body substantially as described above with reference to aircraft 10 of FIG. 1. For example, the ducted fans may be positioned within the body 112 of the aircraft 100, and may be arranged in channel(s) in the body 112 that extend from a front surface of the aircraft to a rear surface to provide an air flow path. Alternatively the aircraft may comprise a propeller arranged as described above with reference to FIG. 1. The aircraft 100 also comprises a payload space and guidance system as described above in relation to the aircraft 10 of FIG. 1.

The wing cover 124 may comprise a plurality of feather or plate like elements (not shown), arranged longitudinally along a length of the cover. Each element may overlap with its adjacent element(s).

The body 112 and the wing cover 124 are made of polystyrene. However, in other examples they may be made of carbon fibre, for example they could be provided as a carbon fibre shell, or other materials such as robust lightweight materials including plastic and cardboard could be used. The components may be manufactured using a laser cutting technique, for example they may be formed of a plurality of laser cut layers of the material. In other examples 3D printing is used to produce these components.

Similarly, the extension frame 120 and the support frame 122 may be made of a plastic material, for example laminated plastic, or other robust lightweight materials such as those mentioned above.

The aircraft 100 comprises a first wing and a second wing on either side of the body, and is substantially laterally symmetric about its central axis. Both wings have the structure and function as described above, and each actuator is operable independently such that the shape and position of each wing can be controlled independently. In this way the roll of the aircraft 100 can be controlled.

It will be understood that at least one controller (not shown) may be configured to operate the actuators 128 of the aircraft 100. For example a single controller may control both actuators, or two separate controllers may control each actuator independently. The controller(s) may be arranged in the aircraft 100, and may be powered by a power source contained in the aircraft 100, and electrically connected to the actuators 128. In other examples the aircraft may be controlled remotely, for example from the ground. The aircraft 100 may be configured to receive a signal from a controller on the ground, for example via a radio frequency antenna, and provide this signal to the actuators 128 to control their operation. The controller may be configured to control the aircraft 100 based on information received from the aircraft 100, e.g. from sensors on the aircraft such as the avionics and actuator sensors described above.

FIGS. 3A-C show examples of the different wing configurations that aircraft 100 described above can have and transition between.

FIG. 3A shows the aircraft in a first, high lift, high drag configuration. In this configuration the extension frame 120 is fully extended outwards from the body 112 such that the wing cover is 124 is spaced from the body 112. In this configuration the wing 114 is substantially planar, with a geometric plane defined between the inner edge of the wing connected to the body 112 and the outer edge of the wing provided by the wing cover 124. It will be understood that the wing 114 in this configuration is not an entirely flat plane as the wing cover 124 has a degree of curvature. The wing 114 extends at substantially 90 degrees from the body 112 about the hinge 126. In operation the exposed portion of the wing around the extension frame 120 may be covered by a foldable material connected to the either the extension frame 120 or the support frame 122. In this configuration, the outermost longitudinal beam of the support frame is fully swept out such that the outer edge of the wing 124 is at an oblique angle to the body and extends outward from its front end to its rear end. In some examples in this configuration the outer edge of the wing is substantially perpendicular to the body 112.

The aircraft 100 comprises a pair of motors 130 connectable to the actuators 128 of each respective wing 114 via an inlet in the side of the body 112. For example the actuator may comprise a linear rod that is extendable and retractable by the motor 130, or the actuator may comprise the rod and the motor 130. Upon activation of the motor the actuator 128 retracts so as to exert an inward force on the wing 114 through its connection to the extension frame 122. In response to this force the extension frame 128 folds inwards and retracts the outer edge of the wing 114 towards the body 112 in plane. Additionally, as the extension frame 128 is retracted the outer edge of the wing (attached to the outermost beam of the support frame—and thereby moveable in the plane of the wing as described above) rotates towards the body 112, that is, the angle between the outer edge of the wing and the body is reduced in the plane of the wing.

Once the frame has been fully retracted it is in an intermediate configuration shown in FIG. 3B. In this configuration the extension frame 120 is fully compressed, while the wing 114 still extends at substantially 90 degrees from the body 112 about the hinge 126.

In this configuration, the aircraft 100 is in a substantially "M"-shaped formation, due to the curvature of the wing cover 124.

Upon further retraction of the actuator 130 the wing is rotated downwards about the 90 degree hinge 126, such that the outer surface of the wing is rotated out of the original plane of the wing and towards an under-surface of the body. Once the wing 114 has been rotated through 90 degrees, it is in a low lift low drag configuration, shown in FIG. 3C.

FIG. 3C shows the aircraft with both wings in a low lift low drag cupped configuration. In this configuration the extension frame is fully compressed, and, because the actuator 128 is fully retracted, the wing extends directly downwards from the hinge 126. In this configuration, the shape of the aircraft 100, in particular the shape of the wings 114 and the body 112 is substantially the same as that described above in relation to FIG. 1. In particular a fluid channel, such as is described above is provided between the inner surface of the wings 114 and the side surface of the body 112.

The actuator can further be operated in reverse to provide an outward force to the extension frame 120. In this case, when the aircraft is in the FIG. 3C configuration, the actuator can apply an outward force to the frame 120 to rotate the frame upwards 90 degrees about the hinge 126 such that the aircraft returns to the intermediate configuration. Upon further extension of the actuator, the extension frame 120 is expanded to extend the frame such that the outer edge of the frame 120 moves away from the body 112 of the aircraft 100, and the outer edge of the wing is rotated outwards in the plane of the wing, away from the body. The extension frame 122 can be fully extended in this way, such that the wing is moved into the high lift high drag configuration.

In each of these configurations, the aircraft 100 has different aerodynamic properties, which may each be preferable for particular different modes of operation or activities that the aircraft is required to perform. For example the high lift high drag configuration may enable the aircraft to operate in a low speed gliding mode, at a stable altitude. The low lift low drag configuration may enable the aircraft to operate at high speeds, and to increase its speed rapidly whilst remaining stable. For example it may enable the aircraft 100 to perform high speed manoeuvres such as 'swooping' rapidly, or performing a stooping dive, for example towards a target. The intermediate configuration may enable the aircraft 100 to remain stable as it transitions between the first and third configurations. For example it may help to prevent the aircraft 100 from stalling as it transitions out of a high speed manoeuvre in the third configuration into a low speed glide in the high lift high drag configuration.

In each of the configurations described above, the wings 114 are 'forward-swept'. That is, following the shape of the front of the wing as it extends away from the body, the front or leading edge of the wing extends forward so as to provide a front 'tip' of the wing, and curves backwards thereafter. This forward sweep thus provides an upstream tip as the aircraft 100 is in flight, which may channel air towards the body 112, for example into the fluid channel provided between wings 114 and the body 112 when the aircraft 100 is in the low-lift low-drag configuration.

The controller (not shown) is configured to actuate the controller to transition the aircraft between the different configurations as described herein. In one example mode of the operation the controller is configured to cause the actuator to retract and thereby to transition the aircraft 100 from the high drag configuration to the low drag configuration, via the intermediate configuration. The controller may then pitch the nose 18 of the aircraft 100 down to initiate a dive, for example the aircraft 100 may dive towards a target with a payload. In other examples the aircraft may complete the dive, and the controller may then pitch up the nose 18 of the aircraft, at which point the controller further causes the actuator to extend and thereby to transition the aircraft 100 from the low drag to the high drag configuration, via the intermediate configuration.

Figure 4:
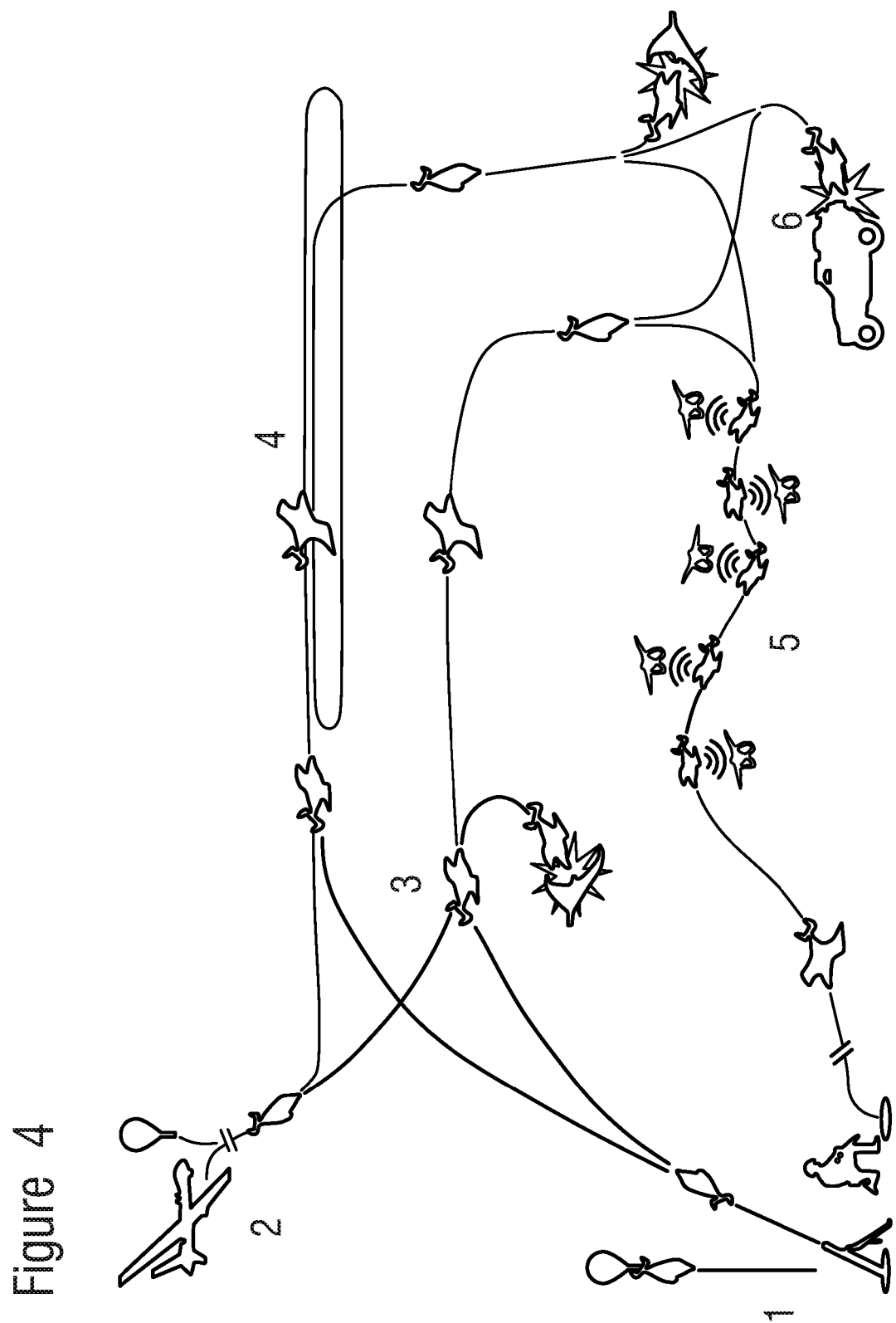
FIG. 4 illustrates several examples of the aircraft in use.

FIG. 4 illustrates some examples of the various potential uses of the aircraft 100, in particular within a military environment. In particular it shows example operational capabilities that may be enabled or enhanced by the aircraft's wing modalities:

1—Ground launch. Example applicable launch methods: The aircraft 100 may be hand launched or catapulted with wings deployed, that is such that the aircraft 100 is in the high lift high drag configuration. Alternatively the aircraft can be launched via catapult or compressed air from a tubular vessel with contracted wings, e.g. as it is in the low lift low drag configuration. Alternatively the aircraft 100 can be released by being affixed to a lighter-than-air balloon. Launch control can be autonomous, semi-autonomous or manual.

2—Air launch. Applicable for launch from altitude via various platforms such as manned aircraft, unmanned air vehicles (UAVs), high altitude long endurance (HALE) vehicles, and release from balloon.

3—Direct interceptions with no or minimal use of loitering and extended wing mode (e.g. minimal use of the first configuration). Interceptions may conclude in sacrificial impact or effecting the target during close flypast with a ranged effector payloads, or single use capture systems like net or entanglement payloads.

4—Launch to loitering operation (remaining at altitude with extended wing mode (high lift high drag configuration)) before interception target selection or return to collection point.

5—Flypast operation with a ranged effector payload, such as Electronic Countermeasures, then return to collection point. Method suitable for sequentially engaging multiple targets such as swarms of micro air vehicles (MAVs).

6—Ground target precision impact/flypast. Wing Modality switching enables erratic or extreme approach vector and velocity change. Examples include targeted delivery of vehicle mobility disruption payloads, or controlled delivery of items to personnel in remote, urban or forested locations.

Figure 5:
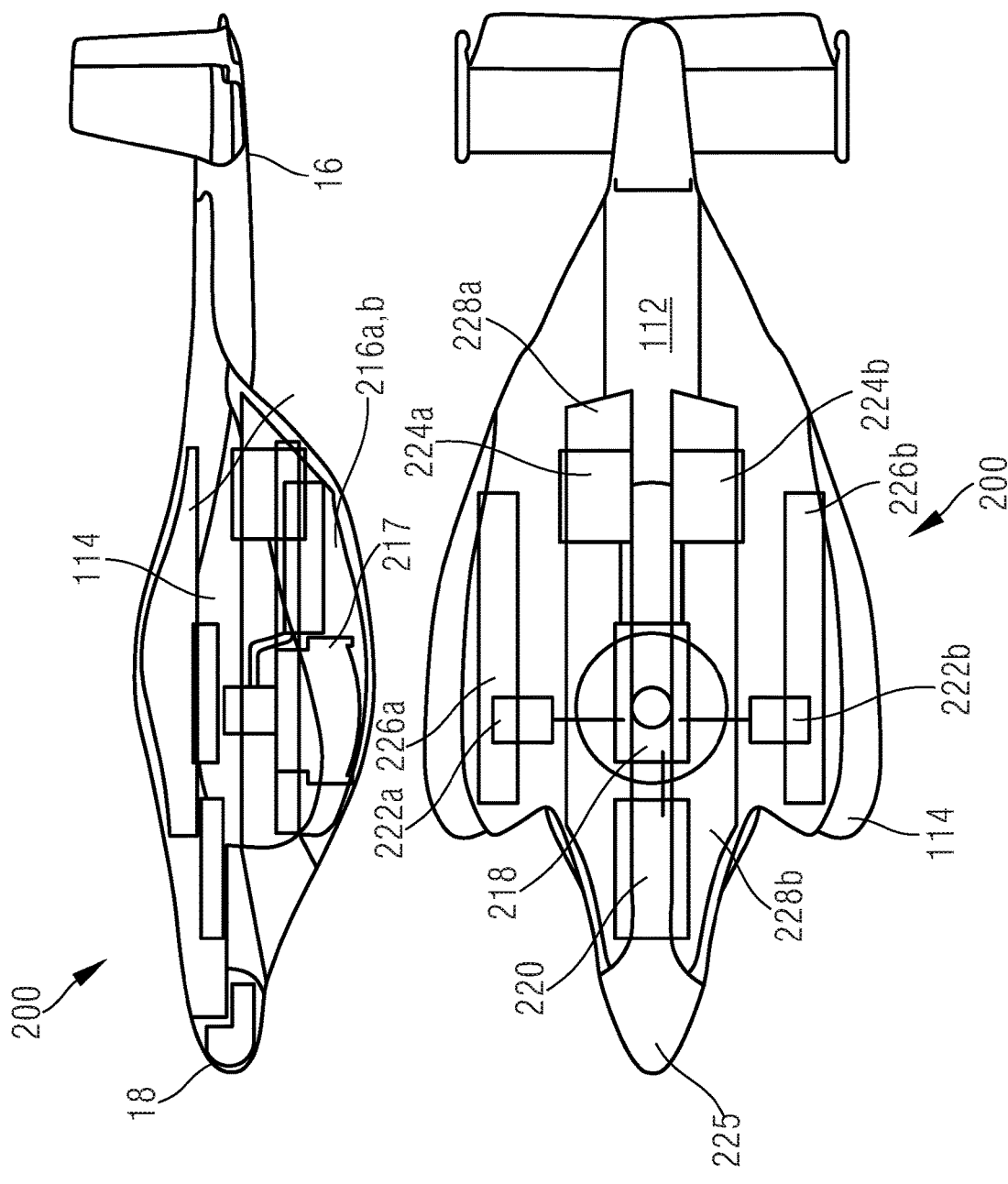
FIG. 5 gives cutaway side and top view of the interior of an example aircraft.

FIG. 5 gives cutaway side and top views of an example aircraft 200. The aircraft 200 comprises a body 112, having a nose 18 and tail 16, as well as wings 114 arranged substantially as described above with reference to FIGS. 2 and 3. The aircraft further comprises two compartments 216a, 216b, which comprise a cavity into which for example a payload can be placed for delivery to a target site. The first compartment 216a is arranged proximal to an upper surface of the body between the two wings. The second compartment 216b is arranged proximal to an under surface of the body between the two wings. In the example shown the second compartment 216a comprises a compartment for a net 217, for example in which a net can be stored and deployed from, and then subsequently retracted to capture an object from a target site. Both compartments 216 are symmetric about the central axis of the aircraft and extend for substantially the length of the wings along the upper and lower surface of the body 112 respectively.

The aircraft further comprises a flight controller 218 arranged substantially at the centre of the aircraft, for example between the wings and below the first compartment 216a. The controller 218 is electrically connected to, and powered by, a battery 220 arranged forward along the central axis of the aircraft 200 from the controller 218. The controller is further electrically connected to a pair of actuators 222a,b, one for each wing 114, and to a pair of ducted fans 224a,b. Each actuator 222a,b is connected to a wing mechanism 226, for example an extension frame, and the controller is configured to control operation of the actuators 222a,b to move the respective wing 114, for example as described above with reference to FIGS. 2 and 3.

The pair of ducted fans 224a,b are each arranged in a respective pair of additional channels 228a,b that extend from a front surface of the aircraft, for example the front of the curved under-surface of the aircraft below the nose 18, to a rear surface of the aircraft, for example the front of the curved under surface of the aircraft below the tail 16. The pair of channels 228a,b are parallel to one another and each extend through the body 112 below the first compartment 216a, controller 218 and battery 220, and above the second compartment 216b. The fans 224a,b are configured to generate a flow through the channels 228a,b, and thereby to generate thrust for the aircraft 200. The controller 218 is configured to control operation of the fans 224a,b, e.g. their speed of rotation, to control the thrust force that they generate.

The aircraft further comprises a camera 225 arranged in the nose 18 of the aircraft 200, for viewing the external environment in front of the aircraft 200. The camera 225 may be connected to transmitter means (not shown) for transmitting the images it captures to an operator on the ground and/or storage means for storing the image data it obtains. In some examples the camera is further electrically connected to the controller 218, for example such that the controller may control operation of the camera and/or obtain image data therefrom.

Figure 6:
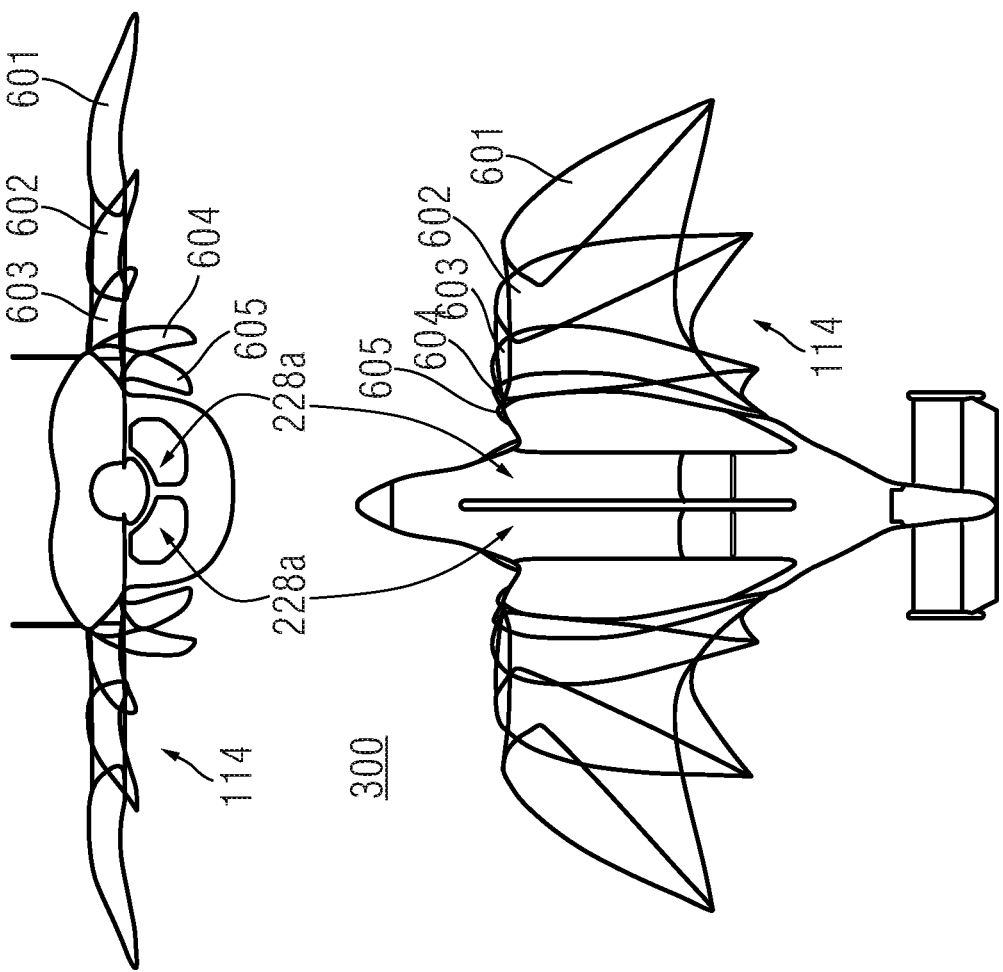
FIG. 6 illustrates an aircraft with wings at various stages of transformation between configurations.

FIG. 6 illustrates front and plan views of an aircraft 300, substantially as described above, and in particular shows the wings 114 of the aircraft 300 at successive stages of the transition between the high lift high drag configuration, and the low lift low drag configuration. The aircraft 300 has a structure substantially as described above with reference to FIG. 5, and comprises a pair of channels 228a,b within the body and a pair of ducted fans 224a,b arranged within the channels 228a,b, as described therein. When the aircraft is in the high lift high drag configuration, each wing is fully extended, and the outer edge of the wing 'kicks' outwards, e.g. as described above, such that the width of the wing is greater at its back edge than at its front edge, as shown at 601. Upon operation of the actuator to exert an inwards force on the wings, as shown at 602, the entire outer edge of the wing is retracted and brought closer to the body, and concurrently the outer edge is rotated in the plane of the wing, towards the body—i.e. so as to reduce the angle between the outer edge of the wing and the body. This retraction is continued until the wing is fully retracted in the plane into the intermediate position, as shown at position 603. Upon further operation of the actuator, the outer edge of the wing is rotated downwards out of the plane, for example about a hinge, and into a low lift low drag configuration, as shown at 604, in which a channel is formed between the wing and the body as described above. The wing may be rotated still further towards the body, into a closed configuration, as shown at 605, in which the wing is positioned tight against the body such that the channels between the wing and the body are substantially closed. It will of course be understood that upon reverse operation of the actuator the wing is also configured to transition between the positions described above in the opposite direction, that is, from the closed configuration 605 into the high lift high drag configuration 601.

Figure 7:
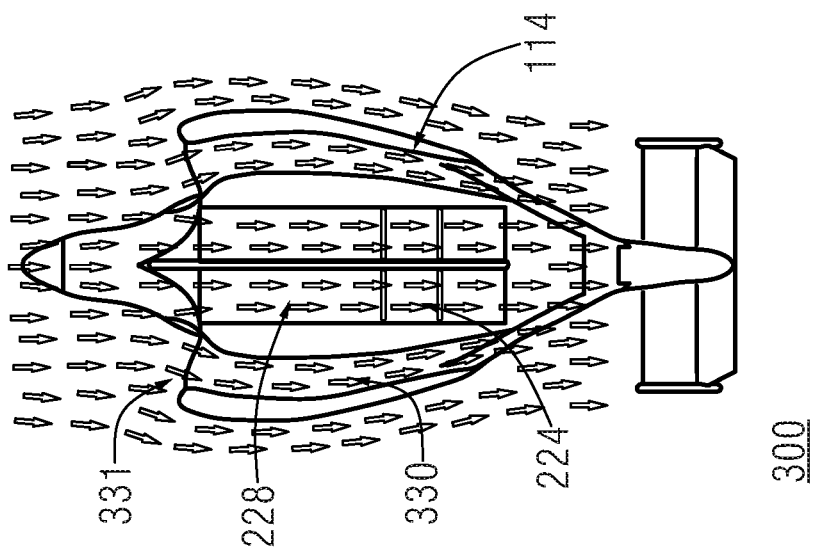
FIG. 7 illustrates the airflow around an aircraft in a particular configuration.

FIG. 7 illustrates the air flow around the aircraft 300 when it is in flight in the low lift low drag configuration (as at 604 in FIG. 6). As shown, the wings 114 are shaped so as to direct air around the outside of the wing 114 and also into channels 330 that are formed between the outer edge of the wings 114 and the body of the aircraft. The leading edges 331 of the wings are swept forward, that is, the outermost point of the front edge of each wing is further forward than the point at which it connects to the body, so as to direct air into the channels 330. In flight, air is also sucked through the inner channels 228 that are provided within the body of the aircraft, in which the ducted fans 224 are positioned, thereby generating thrust for the aircraft.

FIGS. 8A and 8B both show an extendable wing support frame for a wing of an aircraft, each having a structure different to that the support frame 122 described above with reference to FIG. 2. FIG. 8A illustrates a support frame 80 comprising a plurality of longitudinal beams 82 arranged parallel to one another, wherein each longitudinal beam is connected to adjacent beams by a pair of connecting beams 84. More specifically, each connecting beam 84 extends from the front end of one longitudinal beam 82 to a point along the length of an adjacent longitudinal beam 82, such that adjacent longitudinal beams 82 are connected together by two connecting beams 84 that cross one another. The connecting beams 84 are pivotably connected to their respective longitudinal beams 84 such that the longitudinal beams 82 may be brought together and moved apart so as to extend and contract the frame 80 in the plane of the frame

80 in the direction perpendicular to the orientation of the longitudinal beams 82. In FIG. 8A the connecting beams 84 are all of equal length such that upon extension of the frame the longitudinal beams 82 remain parallel to one another and there is no rotation of the outer edge of the frame 80.

FIG. 8B shows another extendable frame 80' comprising a plurality of longitudinal beams 82 arranged parallel to one another and connected together with connecting beams 84a, 84b substantially as described above with reference to FIG. 8A. However, in this example the connecting beams 84a, 84b are not of equal length. Instead each pair of connecting beams that connects adjacent longitudinal beams 82 comprises a first connecting beam 84a, that connects the front end of the respective outer longitudinal beam 82' to a point along the length of the respective inner longitudinal beam, which is shorter than the other connecting beam 84b in the pair. As such, as the frame 80' is extended it splays such that the longitudinal beams 82 rotate relative to one another in the plane of the frame 80', as shown, with the degree of relative rotation between the beams 82' increasing with distance between them. In this way the outer edge of the wing is rotated in the plane of the wing as the frame 80' expands and contracts.

Alternative aircraft structures and methods of operation are also envisaged.

Although the aircraft 100 was described as having a single hinge connecting the body to an extendable frame of the wing, in other examples a hinge may be provided on the wing itself. For example a hinge may be provided between two parts of the wing such that they can pivot relative to one another. An actuator may also be provided on the wing such that the shape of the wing can be varied by pivoting one part of the wing relative to the other. The actuator may be connected between each part of the wing, for example it may be connected to at least one extendable frame. Such a hinge and/or actuator may be used in addition to or as an alternative to the hinge and actuator described above.

In some examples the support frame and the extension frame may be combined, for example the wing cover may be mounted directly onto an expandable frame and there is no need for an additional support frame.

In some examples the aircraft may not comprise an extendable frame. Instead the wing may simply pivot from a first configuration in which the wing is in a first plane, into another configuration in which the outer edge of the wing is rotated downwards out of the plane towards an undersurface of the body, without there being any extension or retraction of the wing in the plane.

Although the hinges have been described herein as simple 90 degree hinges, in other examples the connection between the wing and the body may be provided by a 'ball and socket' type joint. For example, a ball-type connecting element may be provided on the wing that can rotate within a socket of the body. In some examples the wing may be biased into a particular configuration. Additional, flexible, 'tendon'-like connecting elements may be provided to connect the wing to the body in such examples. Such tendons may be extendable and may bias the wing into a particular configuration, e.g. one of the configurations described above. For example, the tendons may act to bias the wings into the low lift, low drag configuration, and the actuator may be configured to apply a force against the bias of the tendons to transition the wing into the high lift, high drag configuration (or vice versa).

In some examples the connection between the wing and the body may be bistable. For example the wing may be biased into one configuration, such as the low-lift low-drag configuration, and upon extension of the actuator beyond a certain point—the wing may be biased into another configuration, such as the high-lift high-drag configuration.

In other examples the outer edge of the wing may be configured to rotate towards the body further than described above, that is, further than the low lift low drag 'cupped' configuration, so as to be 'tucked' under the body of the aircraft. This may be provided via a hinge that allows greater than 90 degree rotation, or by a static or moveable curving element of a frame of the wing or the wing cover. Such a configuration may provide lower drag still than the third configuration described herein, and may provide a reduced effective volume of the aircraft, which may enable the aircraft to fit into a tube for a tubular vessel launch as described above.

In some examples the wing may be attachable and detachable from the body. For example complimentary mating elements may be provided on the inner edge of the wing and the body respectively in order to couple and decouple them.

Although the aircraft has been described has been described as comprising a fan or propeller, in other examples different means of propulsion may be provided, for example a jet.

Furthermore, although the ducted fans and propellers have been described above as being positioned in channels within the aircraft, in other example they may be positioned at other locations about the aircraft. For example, the fans may be arranged externally to the body, for example two fans may be provided with one positioned either side of the body, e.g. each attached to a side face of the body. In some examples the fans may be positioned in the channels formed between the wing and the body, such as the channels provided by the aircraft of FIG. 1 or those provided by the aircraft in the cupped low lift low drag configuration shown in FIG. 3C, and at position 604 in FIG. 6. Positioning the fans external of the body in this way may offer easier access for maintenance, replacement and product assembly. Such an arrangement may also provide a greater internal volume of the body, in comparison to the examples described above, for example so as to provide more space for payloads.

In the methods described above, the wing transforms from the high lift high drag configuration into the low lift low drag configuration by first retracting and rotating inwards towards the body in the plane, and subsequently rotating downwards out of the plane (for example about the hinge)—e.g. rotation about the hinge is inhibited until the wing is in a fully retracted state. However, in other examples hinge rotation may be concurrent to in-plane extension and retraction of the extension frame. For example a compliant or flexible attachment may be provided between the actuator and the extension frame such that some out of plane downward rotation about the hinge is provided before the extension frame is fully retracted. Similarly, in such examples, when transitioning the wing from the low lift low drag configuration to the high lift high drag configuration, some in-plane extension may be provided before the wing is fully rotated upwards into the intermediate configuration.

Although the above examples have been described in relation to an aircraft, alternative types of vehicles are envisaged. For example, in some embodiments the vehicle may be a submarine or submersible vehicle, rather than an aircraft. Such examples may be employed without departing from the scope of the invention, which is defined in the accompanying claims.

In certain examples a controller described herein may be configured to perform any of the methods, or particular steps of said methods. The activities and apparatus outlined herein may be implemented using controllers and/or processors which may be provided by fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

Other variations and modifications of the apparatus will be apparent to persons of skill in the art in the context of the present disclosure.

The invention claimed is:

1. A vehicle comprising:
a morphing wing and a body, wherein the vehicle is configured to transform from a first configuration into a second configuration for ascent or descent of the vehicle, wherein the drag force and lift force on the vehicle in the second configuration are less than in the first configuration;
wherein transforming from the first to the second configuration comprises:
contracting the wing within a geometric plane defined by the wing; and
rotating the outer edge of the wing downwards, out of the geometric plane.

2. The vehicle of claim 1, wherein the vehicle is an aircraft.

3. The vehicle of claim 1, wherein the vehicle is a submarine or submersible.

4. The vehicle of claim 1, wherein the vehicle is configured to hold the wing in the second configuration for the ascent or descent.

5. The vehicle of claim 1, wherein contracting the wing within the geometric plane comprises at least one of:
reducing the angle in the plane between the outer edge of the wing and the body; and
retracting the outer edge towards the body in the geometric plane.

6. The vehicle of claim 1, wherein contracting the wing within the geometric plane defined by the wing comprises reducing the area of the wing.

7. The vehicle of claim 1, wherein rotating the outer edge downwards, out of the geometric plane comprises forming a fluid channel bounded on a first side by an under-surface of the wing and, on a second side opposite the first side, by the body.

8. The vehicle of claim 1 wherein transforming from the first to the second configuration comprises first contracting the wing within a geometric plane defined by the wing to transform into an intermediate configuration; and then rotating the outer edge of the wing downwards, out of the geometric plane to transform into the second configuration.

9. The vehicle of claim 1, further configured to transform from the second configuration into the first configuration.

10. The vehicle of claim 1, wherein the wing is connected to the body by a joint, such as a hinge, about which the wing is pivotable.

11. The vehicle of claim 10, wherein the wing comprises an extendable frame connected to the body by the joint.

12. The vehicle of claim 11, wherein the outer edge of the extendable frame is rotatable from the body in the geometric plane of the wing.

13. The vehicle of claim 12, further comprising an actuator for moving the wing;
wherein the actuator is connected at a first end to the body, and at a second end to the extendable frame.

14. The vehicle of claim 13, wherein the actuator is configured to rotate the outer edge of the extendable frame towards the body, retract the outer edge of the wing towards the body, and rotate the outer edge of the wing downwards, out of the geometric plane, to transform the vehicle from the first configuration to the second configuration.

15. The vehicle of claim 1, wherein, in the second configuration, the downward span of the wing towards the outer edge is arc shaped.

16. The vehicle of claim 1, wherein at least a portion of a leading edge of the wing is swept forward.

17. The vehicle of claim 1, further comprising at least one fan configured to provide thrust for the vehicle.

18. A method of morphing a wing of an vehicle, the vehicle also comprising:
a body, the method comprising transforming the wing from a first, into a second configuration for ascent or descent of the vehicle; wherein the drag force and lift force on the vehicle in the second configuration are less than in the first configuration; and
wherein transforming from the first to the second configuration comprises:
contracting the wing within a geometric plane defined by the wing; and
rotating the outer edge of the wing downwards, out of the geometric plane.

19. The method of claim 18, wherein contracting the wing within the geometric plane comprises at least one of:
reducing the angle in the geometric plane between the outer edge of the wing and the body; and
retracting the outer edge towards the body in the geometric plane.

20. The method of claim 19, wherein transforming from the first to the second configuration comprises steps of:
first, reducing the angle in the geometric plane between the outer edge of the wing and the body and retracting the outer edge towards the body in the geometric plane; and then rotating the outer edge of the wing downwards, out of the geometric plane.

* * * * *